(12) United States Patent
Lindqvist et al.

(10) Patent No.: US 7,613,444 B2
(45) Date of Patent: Nov. 3, 2009

(54) DYNAMIC BUILDING OF MONITORED SET

(75) Inventors: Thomas Lars Erik Lindqvist, Möndal (SE); Tomas Nylander, Värmdö (SE); Jari Tapio Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 11/380,824

(22) Filed: Apr. 28, 2006

(65) Prior Publication Data

US 2007/0254620 A1 Nov. 1, 2007

(51) Int. Cl.
*H04M 11/00* (2006.01)
(52) U.S. Cl. .............. 455/403; 455/422.1; 455/434; 455/443; 455/444
(58) Field of Classification Search .......... 455/403, 455/422.1, 443, 444, 434
See application file for complete search history.

(56) References Cited

U.S. PATENT DOCUMENTS

| | | | |
|---|---|---|---|
| 5,295,153 | A | 3/1994 | Gudmundson |
| 5,920,818 | A | 7/1999 | Frodigh et al. |
| 6,178,327 | B1 | 1/2001 | Gomez |
| 6,430,414 | B1 | 8/2002 | Sorokine et al. |
| 6,532,361 | B1 | 3/2003 | Kamperschroer |
| 6,615,035 | B1 | 9/2003 | Lucidarme et al. |
| 6,853,627 | B1 | 2/2005 | Evans |
| 6,993,359 | B1 | 1/2006 | Nelakanti et al. |
| 7,003,297 | B2 | 2/2006 | Willars et al. |
| 7,054,638 | B2 | 5/2006 | Rune et al. |
| 7,072,656 | B2 | 7/2006 | Willars et al. |
| 7,072,663 | B2 | 7/2006 | Ramos et al. |
| 7,145,890 | B1 * | 12/2006 | Seo et al. .............. 370/331 |

(Continued)

FOREIGN PATENT DOCUMENTS

EP    1 209 940 A1    5/2002

(Continued)

OTHER PUBLICATIONS

International Search Report and Written Opinion mailed Mar. 29, 2007 in corresponding PCT application PCT/SE2006/050355.

(Continued)

*Primary Examiner*—Nghi H Ly
(74) *Attorney, Agent, or Firm*—Nixon & Vanderhye, P.C.

(57) ABSTRACT

A radio access network (24) comprises a radio network control node (26); a database (40); and a femto radio base station node ($28_f$) serving a femtocell ($C_f$) of the radio access network. The femto radio base station node ($28_f$) comprises a receiver (54) for receiving scanned cell information broadcast for one or more receivable cells of the radio access network, and a reporting unit (60). The reporting unit (60) provides the scanned cell information for the one or more receivable cells of the radio access network to the radio network control node (26). The radio network control node (60) is arranged, upon receipt of the scanned cell information, for providing configuration information to the femto radio base station node (for configuring the femto radio base station node) and for storing macro cell information for one or more receivable cells in the database (40). The macrocell information is stored in the database (40) in association with the femto radio base station node.

30 Claims, 4 Drawing Sheets

U.S. PATENT DOCUMENTS

| | | | |
|---|---|---|---|
| 7,295,812 B2 * | 11/2007 | Haapoja et al. ............ | 455/63.1 |
| 7,366,542 B2 | 4/2008 | Schmidt | |
| 2002/0094817 A1 | 7/2002 | Rune et al. | |
| 2002/0111180 A1 | 8/2002 | Hogan et al. | |
| 2002/0123348 A1 | 9/2002 | Willars et al. | |
| 2002/0131387 A1 | 9/2002 | Pitcher et al. | |
| 2002/0151304 A1 | 10/2002 | Hogan | |
| 2002/0187793 A1 | 12/2002 | Papadimitriou et al. | |
| 2003/0013443 A1 | 1/2003 | Willars et al. | |
| 2003/0119501 A1 | 6/2003 | Kim | |
| 2003/0214925 A1 | 11/2003 | Diaz Cervera et al. | |
| 2004/0053630 A1 | 3/2004 | Ramos et al. | |
| 2004/0057420 A1 | 3/2004 | Curcio et al. | |
| 2004/0058606 A1 | 3/2004 | Artamo et al. | |
| 2004/0092259 A1 | 5/2004 | Blanc et al. | |
| 2004/0132486 A1 | 7/2004 | Halonen et al. | |
| 2004/0157600 A1 | 8/2004 | Stumpert et al. | |
| 2004/0203346 A1 | 10/2004 | Myhre et al. | |
| 2004/0203737 A1 | 10/2004 | Myhre et al. | |
| 2004/0203800 A1 | 10/2004 | Myhre et al. | |
| 2004/0258070 A1 | 12/2004 | Arima | |
| 2005/0157673 A1 | 7/2005 | Verma et al. | |
| 2005/0201281 A1 | 9/2005 | Damnjanovic et al. | |
| 2005/0202828 A1 | 9/2005 | Pecen et al. | |
| 2005/0239453 A1 | 10/2005 | Vikberg et al. | |
| 2006/0040664 A1 | 2/2006 | Murray et al. | |
| 2006/0246899 A1 | 11/2006 | Buckley et al. | |
| 2007/0097938 A1 | 5/2007 | Nylander et al. | |
| 2007/0097939 A1 | 5/2007 | Nylander et al. | |
| 2007/0097983 A1 | 5/2007 | Nylander et al. | |
| 2007/0105527 A1 | 5/2007 | Nylander et al. | |
| 2007/0105568 A1 | 5/2007 | Nylander et al. | |
| 2007/0121540 A1 | 5/2007 | Sharp et al. | |
| 2008/0070565 A1 | 3/2008 | Maeda | |

FOREIGN PATENT DOCUMENTS

| | | |
|---|---|---|
| EP | 1 351 530 A1 | 10/2003 |
| EP | 1 363 468 A1 | 11/2003 |
| EP | 1 549 097 A1 | 6/2005 |
| GB | 2 428 942 A | 2/2007 |
| WO | 98/25431 A1 | 6/1998 |
| WO | 99/41932 | 8/1999 |
| WO | 01/80582 A2 | 10/2001 |
| WO | 02/065808 A1 | 8/2002 |
| WO | 03/105380 A1 | 12/2003 |
| WO | 2004/039111 A1 | 5/2004 |
| WO | 2004/040938 A1 | 5/2004 |
| WO | 2005/065214 A2 | 7/2005 |
| WO | 2005/079087 A1 | 8/2005 |
| WO | 2005/086421 A1 | 9/2005 |
| WO | 2005/120101 A1 | 12/2005 |

OTHER PUBLICATIONS

International Search Report and Written Opinion mailed Feb. 27, 2007 in PCT application PCT/SE2006/050370.

International Search Report and Written Opinion mailed May 9, 2007 in PCT application PCT/SE06/050373.

International Search Report and Written Opinion for PCT/SE2006/050367 mailed Feb. 9, 2007.

Menolascino et al, "Third Generation Mobile Systems Planning Issues", Vehicular Technology Conference, 1998, VTC 98, 48th IEEE Ottawa, Ont., Canada, May 18-21, 1998, New York, NY, USA, IEEE, US ISBN 0-6\7803-4320-4, pp. 830-834, esp. Section II F.

International Search Report and Written Opinion mailed Feb. 27, 2007 in PCT application No. PCT/SE2006/050371.

U.S. Appl. No. 11/538,081, entitled "Access Control in Radio Access Network Having Pico Base Stations", filed Oct. 3, 2006.

Shin et al, "Packet Scheduling Over A Shared Wireless Link For Heterogeneous Classes of Traffic", IEEE Communications Society, © 2004 IEEE, pp. 58-62.

U.S. Office Action mailed Dec. 15, 2008 in U.S. Appl. No. 11/538,084.

U.S. Office Action mailed Nov. 25, 2008 in U.S. Appl. No. 11/538,081.

U.S. Office Action mailed Dec. 8, 2008 in U.S. Appl. No. 11/538,080.

U.S. Office Action mailed Dec. 30, 2008 in U.S. Appl. No. 11/538,078.

v U.S. Office Action mailed Sep. 12, 2008 in U.S. Appl. No. 11/380,824.

U.S. Office Action mailed Feb. 4, 2009 in U.S. Appl. No. 11/538,077.

* cited by examiner

DYNAMIC BUILDING OF MONITORED SET

BACKGROUND

I. Technical Field

This invention pertains to wireless telecommunications, and particularly to construction and/or maintenance of a monitored set of cells for a mobile station.

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in WCDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handover of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

Other types of telecommunications systems which encompass radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Source and Serving RNC (SRNC) and a target or drift RNC (DRNC), with the SRNC controlling the connection but with one or more diversity legs of the connection being handled by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), it supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

Some operators are investigating the possibility of providing home or small area WCDMA coverage for limited number of users using a small radio base station ("RBS"), also called a "Femto RBS" and/or a "Home RBS" in some contexts. According to such investigation, the small RBS would provide normal WCDMA coverage for the end users (e.g., to a user equipment unit (UE)), and would be connected to the RNC using some kind of IP based transmission. The coverage area so provided is called a "femto cell" (to indicate that the coverage area is relatively small). One alternative for the IP based transmission is to use Fixed Broadband access (like xDSL, Cable etc.) to connect the home RBS to the RNC. Another alternative would be to use Mobile Broadband access (e.g. HSDPA and Enhanced Uplink).

Problems occur when attempting to perform handover from the macro network (i.e. macrocells) to the femto cells. One significant problem in the handover procedure involves defining or knowing the femto cells in the Neighboring Cell Lists in the macro network. The number of femto cells is estimated to be at least in the magnitude of tens of thousands. On the other hand, the Neighboring Cell List can currently contain thirty two cells for each of the different types of cells, i.e., thirty two Intra-frequency cells, thirty two Inter-frequency cells, and thirty two GSM cells, i.e., ninety six cells in total. Furthermore, it is not feasible to configure this information statically as the end users are able to move the home RBS on their own to a new location.

Another problem occurs in providing Access Control for end user involved in Handover from the macro network to femto cells.

What is needed, therefore, and an object of the present invention, are systems, apparatus, devices, and techniques for building and/or maintaining a monitored set of cells for a mobile station, particularly in a radio access network having both one or more macrocells and one or more femtocells overlaid by macrocell(s).

BRIEF SUMMARY

A radio access network comprises a radio network control node; a database; and a femto radio base station node serving a femtocell of the radio access network. The femto radio base station node comprises a receiver for receiving scanned cell information (broadcast for one or more receivable cells of the radio access network) and a reporting unit, in addition to other elements such as elements which are also found at or similar to those of a macro RBS. The reporting unit provides the scanned cell information for the one or more receivable cells of the radio access network to the radio network control node. The radio network control node is arranged, upon receipt of the scanned cell information, for providing configuration information to the femto radio base station node (for configuring the femto radio base station node) and for storing macro cell information for one or more receivable cells in the database. The macrocell information is stored in the database in association with the femto radio base station node.

In an example embodiment, the example scanned cell information includes one or more of frequency information, scrambling code information, received pilot channel power, and system information broadcasted in the cell for the one or more receivable cells (macrocells and femtocells). Example configuration information sent from a femto RNC to a femto RBS includes the cell identity, frequency information, scrambling code information, control channels power, and system information to be broadcasted in the cell including neighboring macrocell information for the femto cell served by the femto RBS, the neighboring cell being one of an intra-frequency WCDMA cell, and inter-frequency WCDMA cell, and a GSM cell. In general, the configuration information includes information sufficient for supporting handover from the femtocell to an overlaying macrocell.

Preferably but not exclusively, the database resides at a node which is distinct from the femto radio base station node and the radio network control node.

In one example implementation, the radio access network comprises a radio network control node which controls both the femtocell and a macrocell. In other implementations, there can be a separate radio network control for the macrocell and a separate radio network control for the femtocell.

In accordance with another aspect of the technology, the radio access network comprises a radio network control node which is further arranged, when a user equipment unit (UE) in connected mode enters a macrocell of the radio access network, for consulting the database to determine which femtocells of the radio access network are to be included in a monitored set for the user equipment unit (UE). In such implementation, the radio network control node can be further arranged for performing a handover or serving radio network controller (SRNC) relocation towards a femtocell in the monitored set. In conjunction with the handover or serving radio network controller (SRNC) relocation, the radio network control node obtains information from the database to comply with protocols over one or more interfaces.

In accordance with another aspect of the technology, a radio network control (RNC) node of a radio access network is provided which, upon receipt from a femtocell radio base station node of scanned cell information for one or more cells of the radio access network receivable by the femto radio base station node, provides configuration information to the femto radio base station node for configuring the femto radio base station node. In addition, the radio network control node stores macro cell information for one or more receivable cells in the database. The radio network control node stores the macrocell information in the database in association with the femto radio base station node.

For the radio network control node, example scanned cell information includes includes one or more of frequency information, scrambling code information, received pilot channel power, and system information broadcasted in the cell for the one or more receivable cells (macrocells and femtocells). Example configuration information sent from a femto RNC to a femto RBS includes the cell identity, frequency information, scrambling code information, control channels power, and system information to be broadcasted in the cell including neighboring macrocell information for the femto cell served by the femto RBS, the neighboring cell being one of an intra-frequency WCDMA cell, and inter-frequency WCDMA cell, and a GSM cell. In general, the configuration information includes information sufficient for supporting handover from the femtocell to an overlaying macrocell.

In one example implementation, the radio network control node controls both the femtocell and a macrocell. In other implementations, there can be a separate radio network control for the macrocell and a separate radio network control for the femtocell.

In accordance with another aspect of the technology, the radio network control node is further arranged, when a user equipment unit (UE) in connected mode enters a macrocell of the radio access network, for consulting the database to determine which femtocells of the radio access network are to be included in a monitored set for the user equipment unit (UE). In such implementation, the radio network control node can be further arranged for performing a handover or serving radio network controller (SRNC) relocation towards a femtocell in the monitored set. In conjunction with the handover or serving radio network controller (SRNC) relocation, the radio network control node obtains information from the database to comply with protocols over one or more interfaces.

In accordance with another aspect of the technology, there is provided a database for a radio access network. The database stores macrocell information for one or more macrocells having scanned cell information receivable by a femto radio base station serving a femtocell of the radio access network. The macrocell information is stored in association with the femto radio base station node. The database is accessed to determine which femtocells of the radio access network are to be included in a monitored set for a user equipment unit (UE) in connected mode in the radio access network. The database can reside at a node which is distinct from a radio network control node and a radio base station node. For association purposes, the femto radio base station can be identified by a unique string or number comprising one or more of the following: frequency, scrambling code, PLMN-ID, location area code, and cell identifier.

In yet another aspect of the technology, a femtocell radio base station serves a femtocell of a radio access network. The femtocell is at least partially overlapped by a macrocell of the radio access network. The femto radio base station comprises a receiver for receiving scanned cell information broadcast for one or more receivable cells of the radio access network and a reporting unit. The reporting unit provides the scanned cell information for the one or more receivable cells of the radio access network to the radio network control node.

A yet further aspect of the technology concerns a method of operating a radio access network, the radio access network comprising a radio network control node and a femto radio base station node serving a femtocell of the radio access network. The method comprises receiving (at the femto radio base station node) scanned cell information broadcast for one or more receivable cells of the radio access network; providing the scanned cell information for the one or more receivable cells of the radio access network to the radio network control node and, upon receipt of the scanned cell information by the radio network control node; providing configuration information to the femto radio base station node (for configuring the femto radio base station node); and storing macro cell information for one or more receivable cells in a database.

Further example and optional steps of the method include consulting the database when a user equipment unit (UE) in connected mode enters a macrocell of the radio access network to determine which femtocells of the radio access network are to be included in a monitored set for the user equipment unit (UE). Yet further options include performing a handover or serving radio network controller (SRNC) relocation towards a femtocell in the monitored set, and in conjunction with the handover or serving radio network controller (SRNC) relocation obtaining information from the database to comply with protocols over one or more interfaces.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
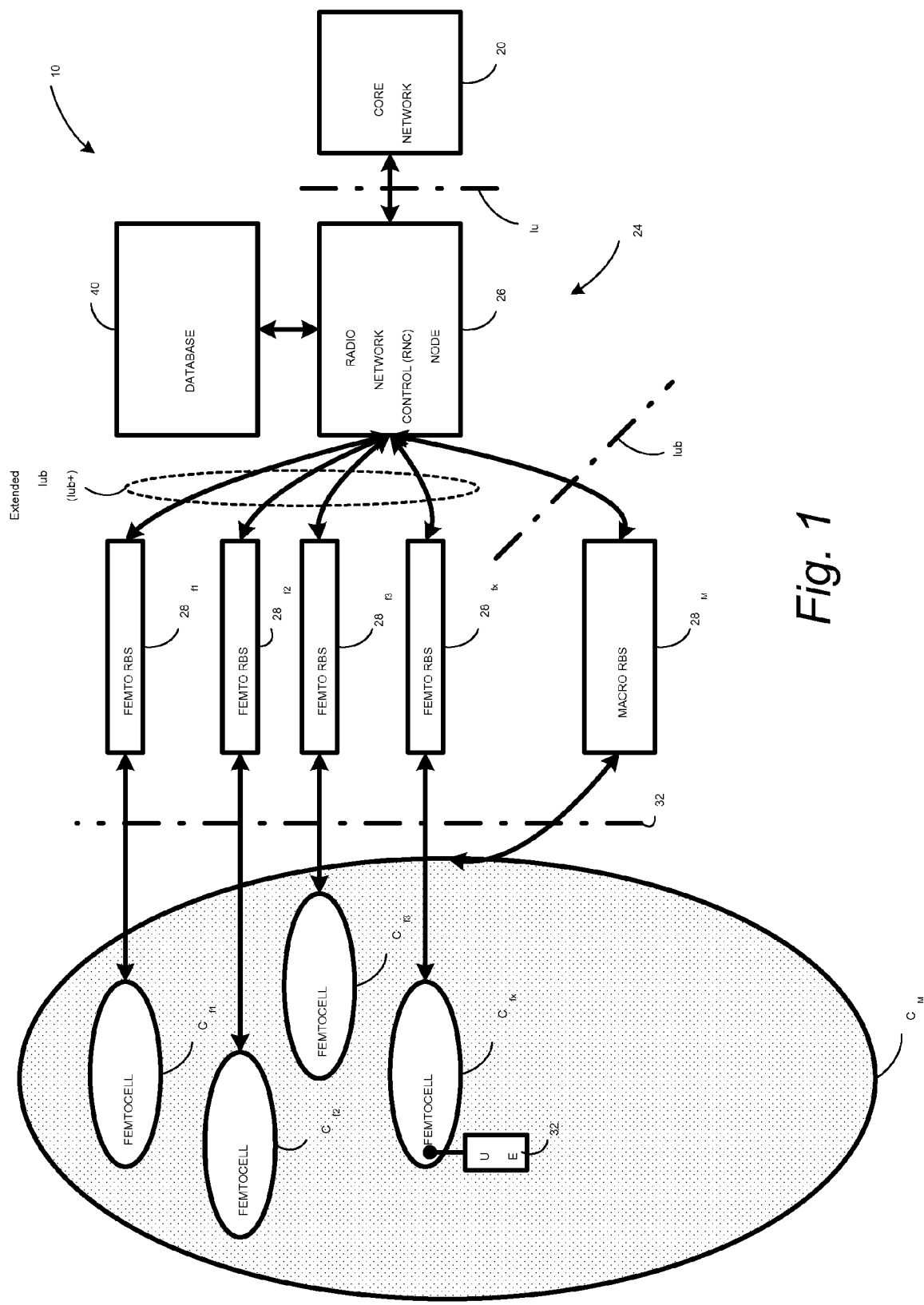
FIG. 1 is a diagrammatic view of an example embodiment of a telecommunications system including a radio access network.

The present invention is described in the non-limiting, example context of a telecommunications system 10 shown in FIG. 1. The telecommunications system 10 connects to a core network 20. The telecommunications system 10 comprises a radio access network 24. The radio access network 24 includes one or more radio network controller nodes (RNCs) 26 and radio base stations (BS) 28. In particular, FIG. 1 shows one radio network control 26 which controls one or more macro radio base stations (only one macro radio base station $28_M$ being shown in FIG. 1) and plural femto radio base stations $28_{f1}$, $28_{f2}$, ... $28_{fx}$. The macro radio base station $28_M$ serves a macrocell $C_M$. The femto radio base stations $28_{f1}$, $28_{f2}$, ... $28_{fx}$ serve respective femtocells $C_{f1}$, $C_{f2}$, ... $C_{fx}$. At least some of the femtocells $C_{f1}$, $C_{f2}$, ... $C_{fx}$ are geographically overlayed or overlapped by the macrocell $C_M$.

A user equipment unit (UE), such as user equipment unit (UE) 30 shown in FIG. 1, communicates with one or more cells or one or more base stations (BS) 28 over a radio or air interface 32. The user equipment unit can be a mobile station such as a mobile telephone ("cellular" telephone) and laptop with mobile termination, and thus can be, for example, portable, pocket, hand-held, computer-included, or car-mounted mobile device which communicate voice and/or data with radio access network.

The radio access network 24 shown in FIG. 1 can be, by way of non-limiting example, a UMTS Terrestrial Radio Access Network (UTRAN). In the UTRAN, radio access is preferably based upon Wideband Code Division Multiple Access (WCDMA) with individual radio channels allocated using CDMA spreading codes. Of course, other access methods may be employed. The nodes 26 and 28 are respectively termed the radio network control node and the radio base station nodes in view of the UTRAN example. However, it should be understood that the term radio network control and radio base station also encompasses nodes having similar functionality for other types of radio access networks. Other types of telecommunications systems which encompass other types of radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

The radio access network 24 is connected to core network 20 over an interface, such as the Iu interface for UTRAN. The core network 20 of FIG. 1 can comprise, among other things a Mobile Switching Center (MSC) node, a Gateway MSC node (GMSC), a Gateway General Packet Radio Service (GPRS) support node (GGSN), and a General Packet Radio Service (GPRS) Service (SGSN) node. Circuit switched (CS) network or packet switched (PS) network can be connected to core network 20.

For sake of simplicity, the radio access network 24 of FIG. 1 is shown with only one RNC node 26. Multiple radio network controller nodes (RNCs) may be provided, with each RNC 26 being connected to one or more base stations (BS) 28. It will be appreciated that a different number of base stations than that shown in FIG. 1 can be served by a radio network control 26, and that RNCs need not serve the same number of base stations. Moreover, although not shown as such in FIG. 1, an RNC can be connected over an Iur interface to one or more other RNCs in radio access network 24. The radio network controller node (RNC) 26 communicates over an interface Iub with the macro radio base station $28_M$. Further, those skilled in the art will also appreciate that a base station such as the macro radio base station 28 is sometimes also referred to in the art as a radio base station, a node B, or B-node.

In addition to radio network control node 26, the macro radio base station $28_M$, and femto radio base stations $28_{f1}$, $28_{f2}$, ... $28_{fx}$, the telecommunications system 10 comprises a database 40. Preferably but not absolutely necessarily, the database 40 resides at a node which is distinct from the femto radio base stations $28_{f1}$, $28_{f2}$, ... $28_{fx}$ and the radio network control node 26. The database 40 can also be termed an access and handover control database.

Each of the radio interface 32, the Iu interface and the Iub interface are shown by dash-dotted lines in FIG. 1. Another interface, the Iur interface which exists between RNC nodes, is not shown in FIG. 1. FIG. 1 also shows by dash-dotted lines an "extended Iub" interface (the "Iub+" interface) which exists between the femto radio base stations $28_f$ and the RNC node 26.

Figure 2:
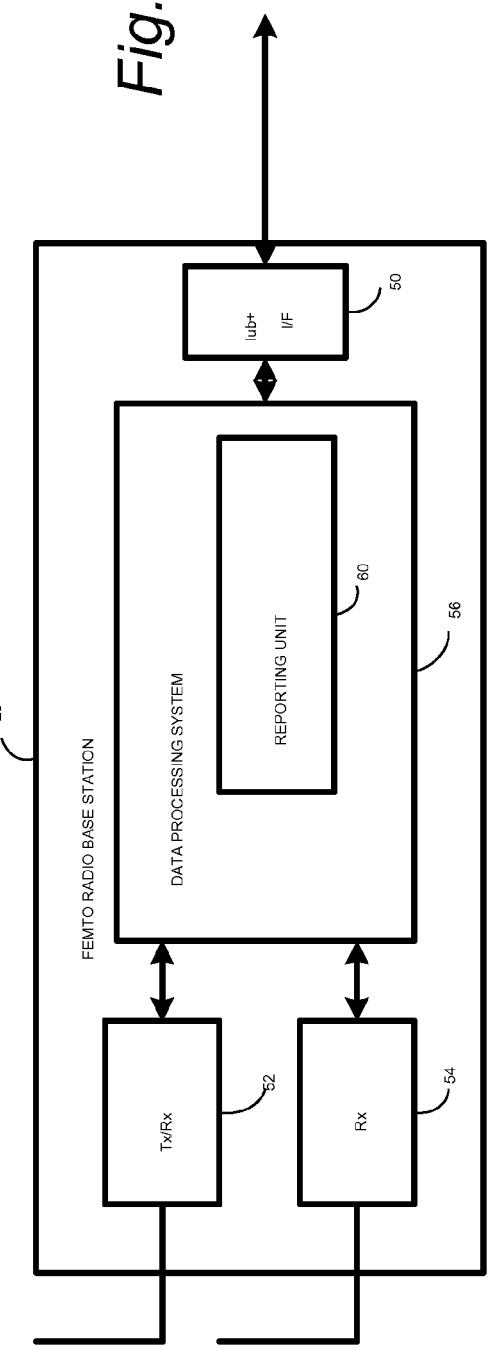
FIG. 2 is a schematic view of an example embodiment of a femto radio base station.

FIG. 2 illustrates basic, selected, representative constituent elements of an example generic femto radio base station $28_f$. One or more of the femto radio base stations $28_{f1}$, $28_{f2}$, ... $28_{fx}$ can take the form of the generic femto radio base station $28_f$ shown of FIG. 2. The femto radio base station $28_f$ of FIG. 2 is shown as including, among its other unillustrated constituent units, an interface unit 50 for connecting with radio network control node 26 over the Iub+ interface; one or more radio frequency transceivers 52; a radio frequency receiver 54; and, a data processing system, section, or unit 56. The interface unit 50 is, in many respects, a normal Iub interface unit, but has extensions for reporting from the femto RBS to the RNC of surrounding cells to facilitate sending configuration information from the RNC to the femto RBS. The radio frequency transceivers 52 are for communicating over the radio or air interface with user equipment units (UEs) in the femtocell served by the femto radio base station $28_f$. The connection between RNC 26 and the femto radio base stations $28_f$ can utilize, e.g., Internet Protocol (IP)-based tranmission.

The femto radio base station node $28_f$ also comprises receiver 54 for receiving scanned cell information broadcast for one or more receivable cells of the radio access network. For example, in one example implementation the home or femto radio base station $28_f$ is equipped with a WCDMA receiver, thereby enabling femto radio base station to camp on signals from receivable cells (including both WCDMA macrocells and femtocells) and to read the relevant scanned cell information broadcast in those cells. In an example embodiment, the scanned cell information includes one or more of frequency information, scrambling code information, received pilot channel power, and system information broadcasted in the cell for the one or more receivable cells (macrocells and femtocells).

The femto radio base station 28 also includes a reporting unit 60. In the illustrated implementation of FIG. 2, reporting unit 60 can comprise or be included in data processing system 56, and thereby be part of a controller or processor. The reporting unit 60 performs services such as, for example, providing the scanned cell information obtained for the one or more receivable cells of the radio access network 24 to the radio network control node 26.

Figure 3:
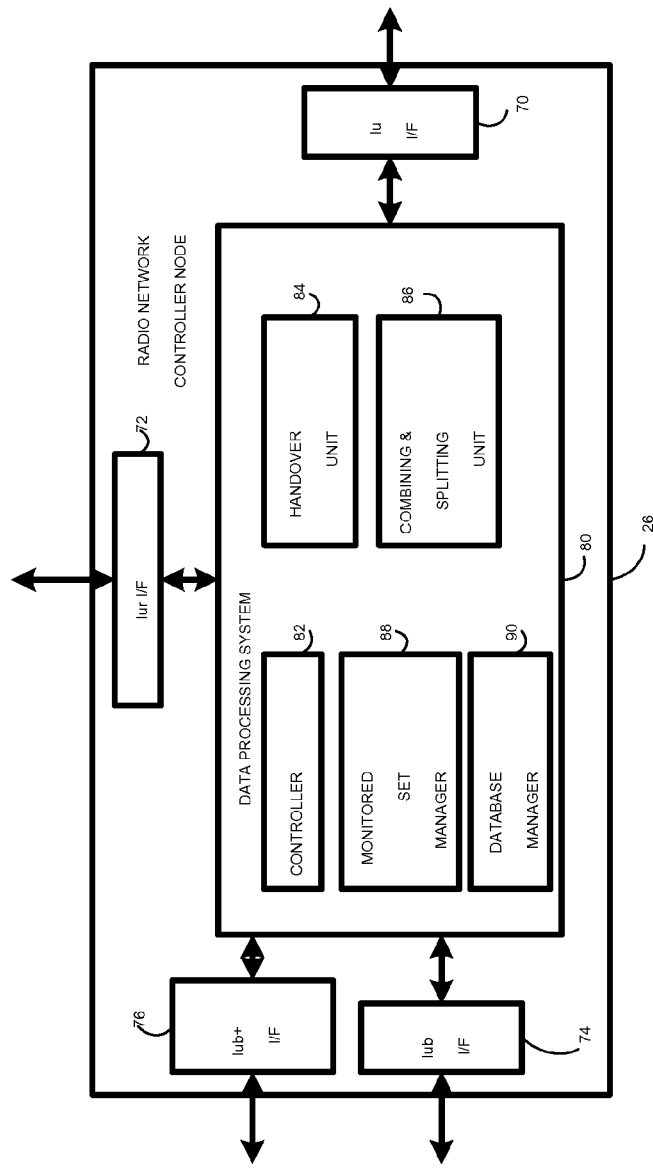
FIG. 3 is a schematic view of an radio network control (RNC) node.

FIG. 3 illustrates basic, selected, representative constituent elements of an example radio network control node 26. The radio network control node 26 can comprise several interface units, such as an interface unit 70 for connecting radio network control node 26 over the Iu interface to core network 20; an interface unit 72 for connecting radio network control node 26 over the Iur interface to other (unillustrated) radio network controllers; one or more interface units 74 for connecting radio network control node 26 over the Iub interface to respective one or more macro radio base station $28_M$; and, one or more interface units 76 for connecting radio network control node 26 over the Extended Iub ("Iub+) interface to respective one or more femto radio base stations $28_{f1}$, $28_{f2}$, ... $28_{fx}$. The connection between RNC 26 and the femto radio base stations $28_m$ can utilize, e.g., Internet Protocol (IP)-based tranmission. The connection between RNC 26 and the macro radio base station(s) $28_M$ can utilize, e.g., Internet Protocol (IP)-based and/or ATM-based tranmission.

In addition to interface units, the radio network control node 26 comprises numerous unillustrated constituent units, as well as a data processing system, section, or unit 80. As shown in FIG. 3, in an example, non-limiting implementation the data processing system 80 of radio network control node 26 comprises a control section (e.g., controller 82); a handover unit 84; a combiner and splitter unit 86 (involved, e.g., in handling diversity legs of a connection); a monitored set manager 88; and, a manager 90 for database 40.

The radio network control node 26 is arranged, upon receipt of the scanned cell information from femto radio base station $28_f$, both to provide configuration information to the femto radio base station node $28_f$ (for configuring the femto radio base station node) and to store macro cell information for one or more receivable cells in the database. The macrocell information is stored in the database 40 in association with the femto radio base station node $28_f$ which sent the scanned cell information.

When a femto radio base station $28_f$ (e.g., home RBS) is powered up, the radio frequency receiver 54 of the femto radio base station $28_f$ scans the surrounding macro coverage to find out which cells (both macro cells and femtocells) are used in that location. In scanning the cell coverage with its receiver 54, the femto radio base station $28_f$ notes the scanned cell information (e.g., frequencies and scrambling codes) broadcast in the received cells. The scanned cell information is reported by the femto radio base station $28_f$ to radio network control node 26. The radio network control node 26 uses this scanned cell information for all received cells to automatically configure the femto radio base station $28_f$ (e.g., the home RBS) and its femto cell, and then to store the configured information for each femto RBS and femto cell in database 40.

When a user equipment unit (UE) enters connected mode in the macro network, the radio network control node 26 checks database 40 to find out which femto cells should be included in the neighboring cell list for this end user (UE) in this macro cell.

Figure 4:
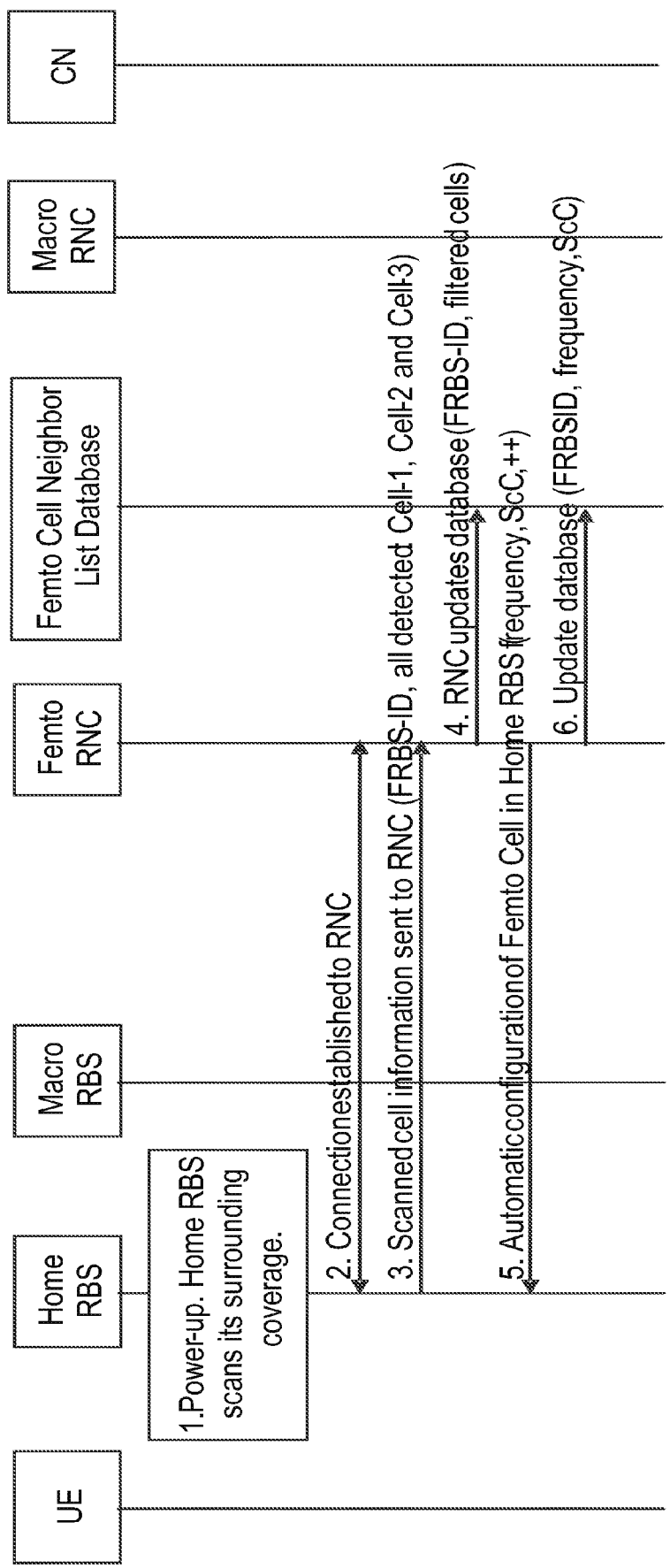
FIG. 4 is a diagrammatic view of basic, example, representative actions or events involved in startup of a femto radio base station.
Figure 5:
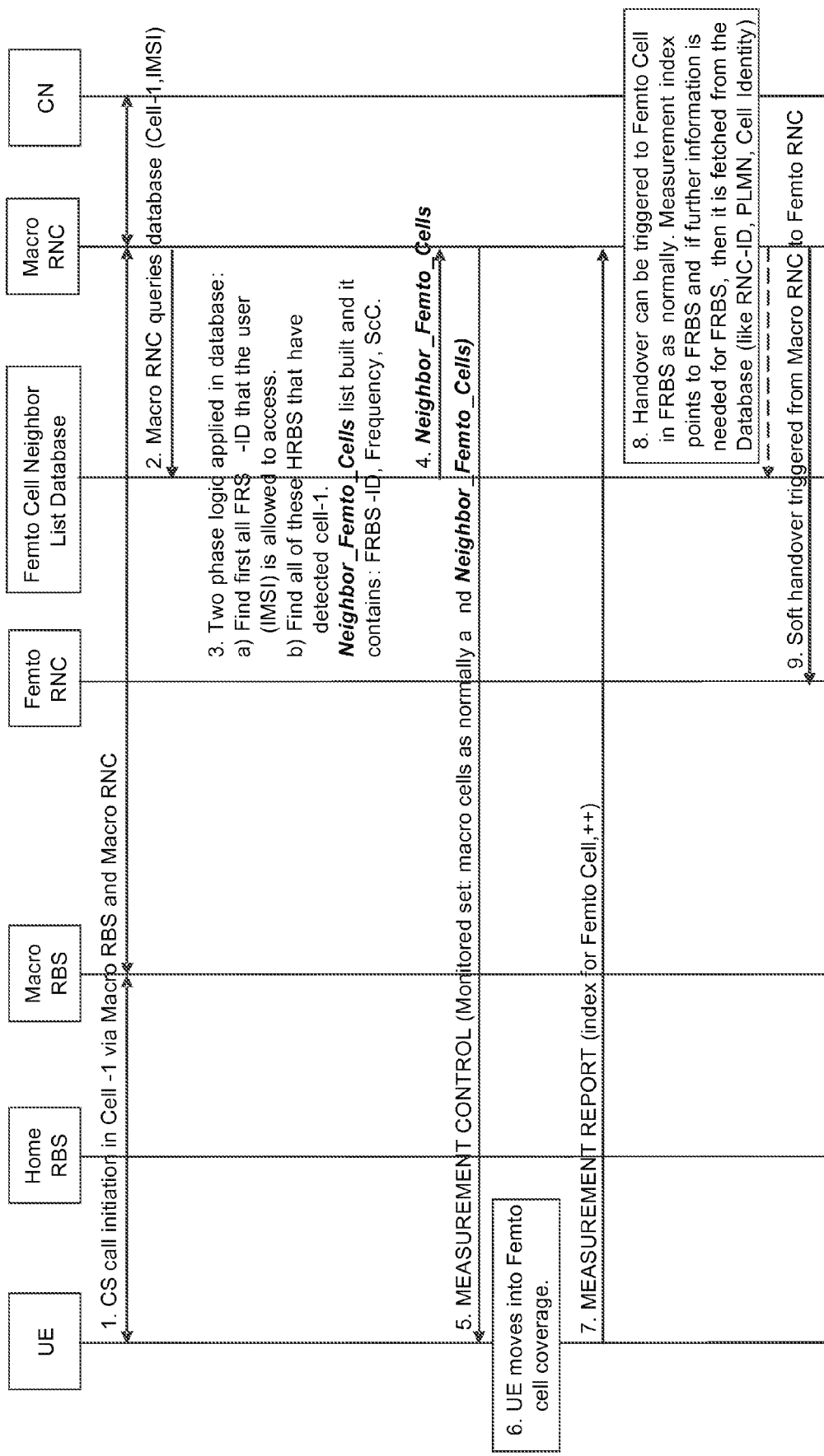
FIG. 5 is a diagrammatic view of basic, example, representative actions or events involved in dynamic building of a monitored set including a micro cell served by a femto radio base station.

FIG. 4 illustrates basic, representative, example events or actions for describing how database 40 is updated when the home RBS 28 is powered up and the femto cell is automatically configured. FIG. 5 illustrates basic, representative, example events or actions for describing how the neighboring cell list is updated with the femto cell specific information.

The examples shown in FIG. 4 and FIG. 5 describe the case when the macro cell and the femto cell are controlled by different RNCs. In FIG. 4 and FIG. 5, the RNC controlling the macro cell is called "Macro RNC" and the RNC that controls the femto cell is called the "Femto RNC". Other configurations are also possible. For example, it could be the just one RNC controlling both the macro and femto cells.

As explained above, the home or femto radio base station $28_f$ is equipped with receiver 54, such as a WCDMA receiver. When home or femto radio base station $28_f$ is powered up, the WCDMA receiver 54 in femto radio base station $28_f$ scans and finds out which frequencies, scrambling codes and cell identities are used in all receivable surrounding cells (step 1 in FIG. 4).

When the scanning is completed and the home or femto radio base station $28_f$ has connected to the Femto RNC (step 2 in FIG. 4), the scanned information (e.g., scanned cell information) for all cells detected is reported to the Femto RNC (step 3 in FIG. 4). In the example of FIG. 4, the femto radio base station $28_f$ has detected three different cells: Cell-1, Cell-2 and Cell-3. Cell-1 and Cell-2 are WCDMA macro cells; Cell-3 is a femto cell.

The scanned cell information received at the RNC is filtered so that all information about femto cells is removed. The Femto RNC can use (for example) information such as the received cell identity or scrambling code to perform this filtering (or any combination of the received information). For example, in some cases specific scrambling codes are reserved and allocated for the femto cells; in some other cases, the Femto RNC is aware of which cell identities are used for femto cells. The remaining macro cell information is stored in the database 40. Using the example from step 3 of FIG. 4, as step 4 of FIG. 4 only information about Cell-1 and Cell-2 is stored in database 40. The reported cells are stored in database 40 in association to the home or femto radio base station $28_f$ which reported this information.

The storage at database 40 of reported femto radio base station $28_f$ in association with the macrocell information permits search of database 40 with at least two query types. A first type of query or search can be to find all home or femto radio base stations $28_f$ that have reported a specific cell. A second type of query or search can be to find all cells that have been reported by a specific home or femto radio base station $28_f$.

Each home or femto radio base station $28_f$ is identified using a unique FRBS-ID which can be configured in the home or femto radio base station $28_f$ at manufacturing time. The format of the FRBS-ID is not important, and can be (for example) a string or a number. The format of the FRBS-ID can be or include (for example) part of all of any one or more of the following: frequency, Scrambling Code, PLMN-ID (MCC, MNC from MIB), Location Area Code (LAC) (from SIB1) and Cell identity (from SIB3).

As step 5 of FIG. 4, the Femto RNC uses the received information to automatically configure the femto RBS. The automatic configuration also includes the selection of the cell identity, frequency and scrambling code to be used. The automatic configuration can include an identification of the intra-frequency WCDMA cell(s), inter-frequency WCDMA cell(s), and possibly GSM neighbor cell(s) to the femto cell associated to the femto RBS in order to support handover from the femto cell to an overlaying macro cell at leaving the femto cell coverage.

As step 6 of FIG. 4, the Femto RNC also stores cell parameters including the cell identity, frequency, and Scrambling Code in the database 40 for this femto RBS. Step 4 and step 6 of FIG. 4 could alternatively be combined and performed after the automatic configuration of the femto RBS $28_f$.

FIG. 4 illustrates initial actions performed when a home or femto radio base station $28_f$ is powered up. The steps of FIG. 4 are prerequisite for the ensuing description of FIG. 5, which concerns automatic building of cell neighbor lists. In FIG. 5, all references to "HRBS" should be understood also to mean "FRBS".

Step 1 of FIG. 5 represents a CS (Circuit Switched) call being established to a user equipment unit (UE). The call of step 1 can be either a mobile-originated (MO) or mobile-terminated (MT) call. In the ensuing description, for sake of illustration only the call is established in the macro network using macro cell called Cell-1. As part of the call establishment, the Macro RNC will configure the user equipment unit (UE) for measurements of the current cell and also other cells. The information sent to user equipment unit (UE) is called the Monitored Set and is a collection of cells that the user equipment unit (UE) is requested (by the network, e.g., by UTRAN) to measure on in order to find candidate cells for handover. Another related concept is called Active Set, which is a collection of cells to which the user equipment unit (UE) has a radio link. Normally the information to be included in the Monitored Set is based on the statically configured neighboring cell lists for the cells belonging to the Active Set (in, e.g., the UTRAN). When the call is set up in Cell-1, this cell becomes initially the only cell in the Active Set.

When the UTRAN is enabled to support femto cells, as step 2 of FIG. 5 the Macro RNC will also query database 40 to find out if femto cells are also to be included in the Monitored Set. Through its database manager 90, the Macro RNC provides the current Active Set (in this example Cell-1 only) to database 40, and also the IMSI. IMSI is received from core network 20 during the call establishment (via a Common ID message). The database 40 is initially configured with the IMSIs that are allowed to access a femto RBS (e.g., a femtocell) for the purpose of access control. Thus, database 40 contains associations between a FRBS-ID and its allowed IMSIs As reflected by step 3 of FIG. 5, the database manager 90 executes a logical two-substep query to the data in the Database (database 40). As a first substep a) of step 3 as shown in FIG. 5, all the allowed femto cells and femto radio base stations 28 for the received IMSI are fetched. This fetching is based on Access Control information also defined in the database to allow/deny only specific subscriptions to access specific micro base stations $28_f$. In the second substep b) of step 3 of FIG. 5, the list retrieved in step one is filtered so that home or femto radio base stations $28_f$ that have not reported any of cells in the Active Set are removed.

The list of femto cells and femto base stations (BS) $28_f$ that is the result of these two substeps of step 3 of FIG. 5 is called Neighbor_Femto_Cells. This list contains frequency and scrambling code for each femto cell and femto RBS.

As step 4 of FIG. 5, the Neighbor_Femto_Cells list is returned to the Macro RNC. As step 5 of FIG. 5, the Macro RNC adds the received information to the Monitored Set of the user equipment unit (UE). When (as step 6 of FIG. 5) the user equipment unit (UE) finds the relevant femtocell, as step 7 of FIG. 5 the user equipment unit (UE) indicates such to the Macro RNC.

As step 8 of FIG. 5, the Macro RNC can then initiate either soft handover or hard handover or SRNS Relocation towards the femtocell. As part of this, the Macro RNC can fetch the needed information from database 40) to be able to conform to the protocols in the Iur and Iu interfaces.

In the example of FIG. 4 and FIG. 5, the Femto RNC controlling this femto cell is accessible via the Iur-interface and a soft handover is triggered from the Macro RNC to the Femto RNC according to existing standards (reflected by step 9 of FIG. 5).

Database 40 is preferably implemented as a standalone node or at least as a functional entity that can be accessed from remote locations. It can, for example, be accessed both from the Femto RNC (for updating the database) and from the Macro RNC (for retrieving information).

As another of its aspects and advantages, this technology also involves/comprises Access Control for connected mode user equipment units (UE) as the Monitored Set in the macro domain only contains information about femto cells that the user equipment unit (UE) is allowed to access.

As another of its aspects and advantages, this technology also allows for a dynamic way to achieve handover from the macro network to the Femto Cell domain.

As another of its aspects and advantages, operation and maintenance effort is also minimized with this technology.

As mentioned previously, the foregoing principle/method can also be applied for other radio technologies. The technology has particular relevance of the aforementioned and conveniently described system and scenarios, but could also be applied in other cases and for other networks.

Although various embodiments have been shown and described in detail, the claims are not limited to any particular embodiment or example. None of the above description should be read as implying that any particular element, step, range, or function is essential. The invention is not to be limited to the disclosed embodiment, but on the contrary, is intended to cover various modifications and equivalent arrangements.

What is claimed is:

1. A radio access network comprising:
a radio network control node;
femto radio base station node serving a femtocell of the radio access network;
a database configured to identify a user equipment unit allowed to access the femtocell;
wherein the femto radio base station node comprises:
a receiver configured to receive, from one or more receivable cells of the radio access network, scanned cell information broadcast for one or more receivable cells of the radio access network;
a reporting unit configured to report the scanned cell information for the one or more receivable cells of the radio access network to the radio network control node;
wherein the radio network control node is arranged to provide macrocell information obtained from the scanned cell information to the data base, and wherein the radio network control node is further arranged, when a user equipment unit in connected mode enters a macrocell of the radio access network, for consulting the database to determine which femtocells of the radio access network are to be included in a monitored set for the user equipment unit.

2. The radio access network of claim 1, wherein the macrocell information is stored in the database in association with the femto radio base station node.

3. The radio access network of claim 1, wherein the scanned cell information comprises frequency information, scrambling code information, and cell identification information for the one or more receivable cells.

4. The radio access network of claim 3, wherein the configuration information includes the scanned cell information and an identifier of a neighboring cell to the femtocell, and wherein the neighbor cell is one of an intra-frequency WCDMA cell, and inter-frequency WCDMA cell, and a GSM cell.

5. The radio access network of claim 1, wherein the radio network control node is arranged for storing macrocell information for the one or more receivable cells which are macrocells.

6. The radio access network of claim 1, wherein the configuration information includes information sufficient for supporting handover from the femtocell to an overlaying macrocell.

7. The radio access network of claim 1, wherein the database resides at a node which is distinct from the femto radio base station node and the radio network control node.

8. The radio access network of claim 1, wherein the radio network control node controls both the femtocell and a macrocell.

9. The radio access network of claim 1, wherein the radio network control node is further arranged, upon receipt of the scanned cell information, for providing configuration information to the femto radio base station node for use in configuring the femto radio base station node and for storing macro cell information for one or more receivable cells in the database.

10. The radio access network of claim 9, wherein the radio network control node is further arranged for performing a handover or serving radio network controller (SRNC) relocation towards a femtocell in the monitored set, and wherein in conjunction with the handover or serving radio network controller (SRNC) relocation the radio network control node obtains information from the database to comply with protocols over one or more interfaces.

11. A radio network control (RNC) node of a radio access network which, upon receipt from a femtocell radio base station node of scanned cell information for one or more cells of the radio access network, the scanned cell information being receivable from one or more receivable cells of the radio access network by a receiver of the femto radio base station node, provides macrocell information obtained from the scanned cell information to a data base, and wherein the radio network control node is further arranged, when a user equipment unit in connected mode enters a macrocell of the radio access network, to consult the database to determine which femtocells of the radio access network are to be included in a monitored set for the user equipment unit.

12. The radio network control (RNC) node of claim 11, wherein the radio network control node stores the macrocell information in the database in association with the femto radio base station node.

13. The radio network control (RNC) node of claim 11, wherein the scanned cell information comprises frequency information, scrambling code information, and cell identification information for the one or more receivable cells.

14. The radio network control (RNC) node of claim 13, wherein the configuration information includes the scanned cell information and an identifier of a neighboring cell to the femtocell, and wherein the neighbor cell is one of an intra-frequency WCDMA cell, and inter-frequency WCDMA cell, and a GSM cell.

15. The radio network control (RNC) node of claim 11, wherein the radio network control node is arranged for storing macrocell information for the one or more receivable cells which are macrocells.

16. The radio network control (RNC) node of claim 11, wherein the configuration information includes information sufficient for supporting handover from the microcell to an overlaying macrocell.

17. The radio network control (RNC) node of claim 11, wherein the database resides at a node which is distinct from the femto radio base station node and the radio network control node.

18. The radio network control (RNC) node of claim 11, wherein the radio network control node controls both the femtocell and a macrocell.

19. The radio network control (RNC) node of claim 11, wherein the radio network control node is further arranged, upon receipt of the scanned cell information, to provide configuration information to the femto radio base station node for configuring the femto radio base station node.

20. The radio access network of claim 9, wherein the radio network control node is further arranged for performing a handover or serving radio network controller (SRNC) relocation towards a femtocell in the monitored set, and wherein in conjunction with the handover or serving radio network controller (SRNC) relocation the radio network control node obtains information from the database to comply with protocols over one or more interfaces.

21. A method of operating a radio access network, the radio access network comprising a radio network control node and a femto radio base station node serving a femtocell of the radio access network, the method comprising:
at the femto radio base station node receiving scanned cell information broadcast for one or more receivable cells of the radio access network;
providing the scanned cell information for the one or more receivable cells of the radio access network to the radio network control node and, upon receipt of the scanned cell information by the radio network control node;
providing macrocell information obtained from the scanned cell information to the data base; and
when a user equipment unit in connected mode enters a macrocell of the radio access network, consulting the database to determine which femtocells of the radio access network are to be included in a monitored set for the user equipment unit.

22. The method of claim 21, further comprising storing the macrocell information in the database in association with the femto radio base station node.

23. The method of claim 21, wherein the scanned cell information comprises frequency information, scrambling code information, and cell identification information for the one or more receivable cells.

24. The method of claim 23, wherein the configuration information includes the scanned cell information and an identifier of a neighboring cell to the femtocell, and wherein the neighbor cell is one of an intra-frequency WCDMA cell, and inter-frequency WCDMA cell, and a GSM cell.

25. The method of claim 21, further comprising storing macrocell information for the one or more receivable cells which are macrocells.

26. The method of claim 21, wherein the configuration information includes information sufficient for supporting handover from the microcell to an overlaying macrocell.

27. The method of claim 21, further comprising locating the database resides at a node which is distinct from the femto radio base station node and the radio network control node.

28. The method of claim 21, further comprising using the radio network to control node to control both the femtocell and a macrocell.

29. The method of claim 21, further comprising:
providing configuration information to the femto radio base station node for configuring the femto radio base station node; and
storing macro cell information for one or more receivable cells in a database.

30. The method of claim 29, further comprising performing a handover or serving radio network controller (SRNC) relocation towards a femtocell in the monitored set, and in conjunction with the handover or serving radio network controller (SRNC) relocation obtaining information from the database to comply with protocols over one or more interfaces.

* * * * *

UNITED STATES PATENT AND TRADEMARK OFFICE
CERTIFICATE OF CORRECTION

PATENT NO.        : 7,613,444 B2
APPLICATION NO.   : 11/380824
DATED             : November 3, 2009
INVENTOR(S)       : Lindqvist et al.

It is certified that error appears in the above-identified patent and that said Letters Patent is hereby corrected as shown below:

Title Page;
On Page 2, in Field (56), under "OTHER PUBLICATIONS", in Column 2, Line 25, before "U.S." delete "v".

In Fig. 2, Sheet 2 of 4, delete Tag "28" and insert Tag -- $28_f$ --, therefor.

In Fig. 4, Sheet 3 of 4, Step 5, delete "f(requency,ScC,++)" and insert -- (frequency,ScC,++) --, therefor.

In Fig. 4, Sheet 3 of 4, Step 6, delete "FRBSID," and insert -- FRBS-ID --, therefor.

In Fig. 5, Sheet 4 of 4, Step 3a, delete "FRS -ID" and insert -- FRBS-ID --, therefor.

In Fig. 5, Sheet 4 of 4, Step 3b, delete "HRBS" and insert -- FRBS --, therefor.

In Fig. 5, Sheet 4 of 4, Step 5, delete "a nd" and insert -- and --, therefor.

In Column 8, Line 59, delete "$28_m$" and insert -- $28_M$ --, therefor.

In Column 13, Line 51, in Claim 20, delete "9," and insert -- 19, --, therefor.

Signed and Sealed this

First Day of June, 2010

David J. Kappos
*Director of the United States Patent and Trademark Office*